United States Patent
Adams et al.

(10) Patent No.: US 6,171,533 B1
(45) Date of Patent: Jan. 9, 2001

(54) MULTIPURPOSE COMPOSITE TUBING

(75) Inventors: Kevin Adams, Alfords Point; Mariano Villaescusa, Five Dock; Michael Clarkson, Waverly, all of (AU)

(73) Assignee: Cerntube Pty Ltd., New South Wales (AU)

(*) Notice: Under 35 U.S.C. 154(b), the term of this patent shall be extended for 0 days.

(21) Appl. No.: 08/836,093
(22) PCT Filed: Oct. 25, 1995
(86) PCT No.: PCT/AU95/00715
§ 371 Date: Jun. 24, 1997
§ 102(e) Date: Jun. 24, 1997
(87) PCT Pub. No.: WO96/12602
PCT Pub. Date: May 2, 1996

(30) Foreign Application Priority Data

Oct. 25, 1994 (AU) .................................................. PM 9036

(51) Int. Cl.⁷ .............................. B29D 9/00; B29D 22/00; B29C 65/00
(52) U.S. Cl. ...................... 264/45.2; 264/45.5; 264/45.8; 264/46.5; 428/36.5; 428/36.91
(58) Field of Search ................................ 428/36.5, 36.91; 264/45.1, 45.8, 46.1, 46.2, 45.2, 45.5, 46.5

(56) References Cited

U.S. PATENT DOCUMENTS

| | | | | |
|---|---|---|---|---|
| 3,366,718 | * | 1/1968 | Komada | 264/45.7 |
| 3,392,220 | * | 7/1968 | Jennings | 264/45.5 |
| 4,206,785 | | 6/1980 | Graafmann et al. | 138/149 |
| 4,263,365 | * | 4/1981 | Burgess et al. | 428/312.4 |
| 4,271,218 | * | 6/1981 | Heckel et al. | 428/36.5 |
| 4,348,243 | * | 9/1982 | Craubner | 428/36.9 |
| 4,371,023 | * | 2/1983 | Campagna | 428/36.5 |
| 4,372,028 | * | 2/1983 | Clark et al. | 264/46.9 |
| 4,438,056 | * | 3/1984 | Bast | 264/45.2 |
| 4,447,377 | * | 5/1984 | Denton | 264/45.2 |
| 4,568,579 | * | 2/1986 | Watson | 428/36.5 |
| 4,874,648 | * | 10/1989 | Hill et al. | 428/36.5 |
| 5,000,893 | * | 3/1991 | West et al. | 264/45.2 |
| 5,024,865 | * | 6/1991 | Insley | 428/36.5 |
| 5,160,769 | * | 11/1992 | Garrett | 428/36.5 |
| 5,405,665 | * | 4/1995 | Shukushima et al. | 428/36.5 |
| 5,427,849 | * | 6/1995 | McClintock et al. | 428/36.5 |
| 5,569,513 | * | 10/1996 | Fidler et al. | 428/36.5 |

FOREIGN PATENT DOCUMENTS

| | | |
|---|---|---|
| 882206 A1 | 7/1980 | (BE). |
| 2714576 A1 | 10/1978 | (DE). |
| 4215919 A1 | 11/1993 | (DE). |
| 0018048 A1 | 10/1980 | (EP). |
| 0048522 A1 | 3/1982 | (EP). |
| 2490993 | 4/1982 | (FR). |
| 2046865 | 11/1980 | (GB). |
| 51-012876 | 1/1976 | (JP). |
| 51-012877 | 1/1976 | (JP). |
| 76-025072 | 7/1976 | (JP). |
| 56-117626 | 9/1981 | (JP). |
| 56-136337 | 10/1981 | (JP). |

* cited by examiner

*Primary Examiner*—Rena L. Dye
(74) *Attorney, Agent, or Firm*—Woodcock Washburn Kurtz Mackiewicz & Norris LLP

(57) ABSTRACT

A novel tube material, and method of forming the tube, are described. The tube has an inner liner, preferably flexible, an intermediate layer of in situ molded expanding foam material, and a flexible outer liner. The tube is rigid, with the structural strength derived entirely from the intermediate layer. The preferred method of construction uses an inner core which is used to hold the inner liner in place during forming. The inner core includes a mechanism to reduce its diameter, to facilitate removal after curing of the foam.

16 Claims, 1 Drawing Sheet

MULTIPURPOSE COMPOSITE TUBING

INTRODUCTION

This invention relates to multi-purpose composite tubing that has a broad range of applications including but not limited to duct work for air conditioning, protective lining for buried pipes, piping for dredging operations and form work for casting concrete.

DESCRIPTION OF THE PRIOR ART

Tubing products presently used for dredging, piping, form work and other applications have a number of drawbacks.

For example cardboard tubing that is used in casting concrete pillars leaves a low grade finish that in some applications requires further rendering to be performed on the pillar. The cardboard tubing is also generally circular in cross section making it unsuitable for casting square pillars.

Air conditioning duct is commonly comprised of spiral wound sheet metal surrounded by insulation material. However in some air conditioning applications where the insulation is insufficient condensation forms on the metal tubing, which can lead to corrosion and other problems.

Piping that is used to pump sand from a dredger to a filter or other collection point frequently requires assistance in the form of attached floats to increase the buoyancy of the pipe These floats increase the labour cost of setting up such a dredging operation along with increasing the capital cost and equipment required.

Buried piping commonly has protective coatings such as paint and galvanising applied to prevent corrosion and other problems occurring. However during backfilling it is necessary to cover the pipe with fine sand so that the coating is protected from moving debris during the back filling operation.

It Is desirable for many of these applications to provide a lightweight, strong tube which is not susceptible to water damage.

Some tubing is known which is formed from composite layers, including a foam material, for example hosing as disclosed in Australian patent application No. 5802086, which discloses a flexible hose material. Composite materials using foam for conduits are disclosed in British patent application No. 2046661, and for tubing as disclosed in U.S. Pat. No. 3,665,968. In the latter two arrangements, the structural strength of the material is provided by a rigid outer layer.

SUMMARY OF THE INVENTION

According to one aspect the present Invention provides a method of manufacturing a composite tube comprising the steps of a) supporting and locating an inner liner on an inner mould core;

b) locating and supporting a flexible outer liner in axial alignment with the inner liner, so as to create a sealed annular space between the liners;

c) introducing a foaming material between the liners so as to fill the annular space;

d) allowing the foaming material to cure sufficiently to allow removal from the mould; and e) reducing the cross-sectional area of said inner mould core after forming said tube to facilitate extraction of said tube from said mould.

Reducing the cross sectional area of the Inner mould core once the tube has been formed breaks any surface tension sealing effect that may occur between the inner core and the inner liner before the tube is extracted from the mould. This has been found to aid in the de-moulding of the tube during the manufacturing process.

Preferably the amount of foaming material introduced is chosen so that it will fill the entire void, without leaving any interior spaces. This is desirable to ensure the structural characteristics of the tube are consistent. The use of an expanding foam material according to the inventive method has the capacity to minimise the risk of interior spaces occurring.

Preferably said inner mould core is formed of at least two parts which are relatively displaceable so that the cross sectional area of the inner mould core can be reduced alter forming. Preferably the inner mould parts are relatively displaceable along at least one plane longitudinal with the mould.

Alternatively, the inner mould core may be inflatable or otherwise constructed to allow for reduction of the diameter of the inner core.

Another alternative aspect of the invention provides that the outer liner may also be supported by an outer mould core. Such an outer mould core may be formed of at least two parts that are displaceable to facilitate extraction of a formed tube.

Preferably spacing elements located between said Inner core and said outer core facilitate the correct alignment, and form a closed space for region for the insertion of an expanding foam material.

According to another aspect the present invention provides a tubing material, comprising a flexible outer liner, an inner liner, and a rigid foam material integrally formed between the inner and outer liner, said foam material providing structural rigidity to the tubing material.

Preferably, the inner liner is formed from a flexible material, and the outer liner is formed from a sleeve of non-rigid material, for example a foil or a woven polymer mesh, depending upon the required application.

The inner liner may be of a different cross sectional shape to the outer liner.

In applications encountering great hoop stress a number of outer liners may be located at differing radii throughout the filler material. This is preferably achieved by locating at least two woven liners of different diameters concentric with the mould and then inserting the filler material.

Preferably a polyethylene liner is located between the expanding foam material and the final outer woven structure. The outer liners may be permeable to the uncured foam material.

Preferably the foam is an expandable foam such as polyurethane. The tube may be is constructed of any combination of liners and/or filler material so as to be impact resistant.

The present Invention provides a tube which is lightweight yet strong, and is relatively inexpensive. The use of a flexible inner and outer liner, and a foaming material, means that space requirements for storage of raw materials are minimised, as the liners may be easily dispensed from a roll or the like, and the foam material is only expanded during manufacture. The in-situ foaming also provides a very good bond between the foam and the liners. The tubing may be altered in its constituent components depending upon the application, and the method of manufacture disclosed facilitates easy manufacture of short runs of customised tubing, if required.

BRIEF DESCRIPTION OF THE DRAWINGS

An embodiment of the present invention will be described with reference to the accompanying figures, in which.

DESCRIPTION OF THE PREFERRED EMBODIMENT

Figure 1:
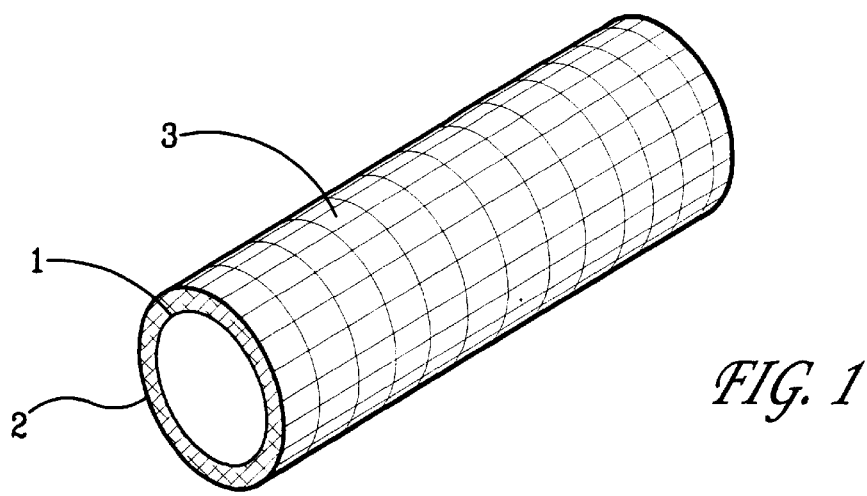
FIG. 1 is a perspective view of a composite tube.

Referring to FIG. 1, the multi purpose composite tube comprises an inner liner 1, an outer liner 3 and a foam material 2 which separates and joins the two liners. The tube is intended to be used to conduct, transport, retain or hold a broad range of substances, including, air, water and other liquids, sand, slurries and other solid particulate substances. The tube may also retain concrete, plaster, plastics or rubber materials. It will be appreciated that the materials, in particular for the inner and outer liners, will be chosen to suit the intended application.

The inventive tube differs from the prior art in that it uses flexible materials for at least the outer layer and preferably for the inner layer, with the rigidity of the finished product being supplied by the characteristics of the in situ foamed material. There is no preformed tube or pipe which is coated—the form is created during the moulding process.

The form of the tube is not limited to any particular length or internal diameter or external diameter. The tube also is not limited to any particular shape, either internally or externally.

Figure 3:
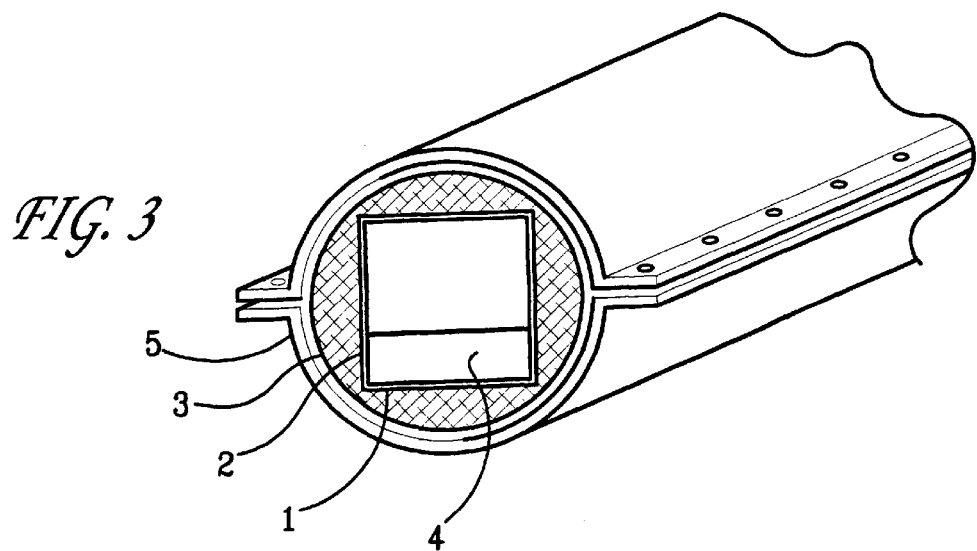
FIG. 3 is an cut away end view of the mould after placement of the inner liner, outer liner and filler material, before the tube is removed.

Referring to FIG. 3, in one method of construction the inner liner 1 is fitted over and supported by inner mould 4. The inner mould and liner are then located within an outer mould 5. An outer liner 3 is preferably supported on the outer mould 5. This creates a structure where the inner liner 1 is located in axial alignment with the outer liner 3. Depending upon the characteristics of the outer liner and the foaming material, the outer mould may not be required.

Figure 2:
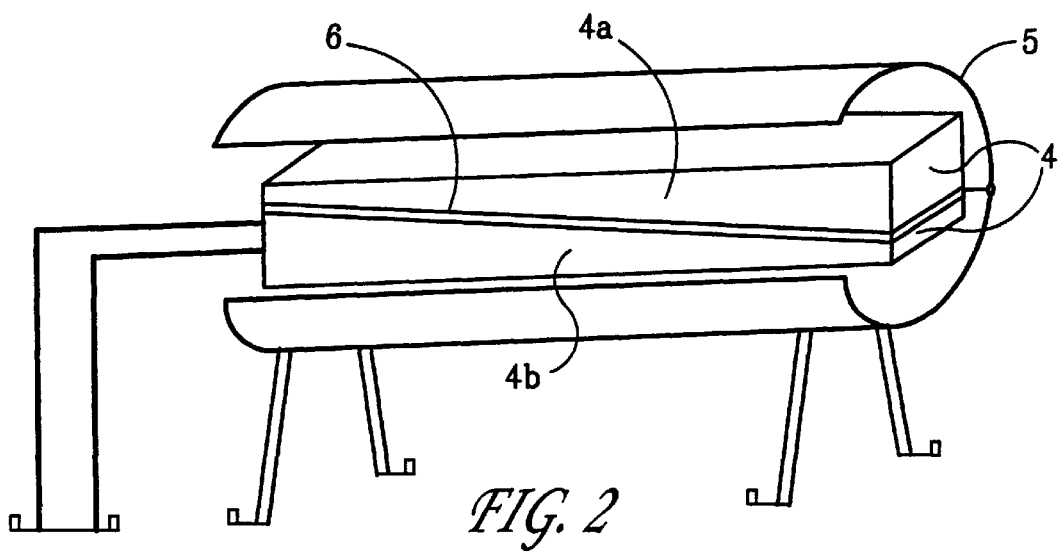
FIG. 2 is a perspective view of a mould for use in the above process with a square inner mould core.

Preferably support element 7 as shown in FIG. 2 supports the Inner mould at working height. To ensure stability and uniformity of cross section in the tube. It is preferable that spacer elements be located between the inner mould and the outer mould. These spacers will preferably operate to support the outer mould upon the inner mould.

Preferably either end of the mould is sealed by a plug arrangement and the foam material is inserted into the mould, preferably under pressure. This expands to fill the cavity between the outer mould and the inner mould. Once the foam material sets sufficiently and the liners bind to the filler material, the composite tube is formed and may then be removed from the mould. It will be appreciated that subject to selection of suitable inner and outer liner materials, and the foam material, the foam will be bonded integrally to the liners, so as to create a stable composite construction.

During formation of the tube, surface tension effects between the mould and the tube tend to make it difficult to remove the formed tube form the mould.

Reducing the cross-sectional area of the inner mould allows these effects to be reduced so that the tube can be more readily de-moulded.

The preferred method of reducing this area is to employ an inner mould core that is a split into two parts. This can be seen in FIG. 2, where the inner mould 4 is split along plane 6.

After the tube has set, the two halves of the inner mould are displaced relative to each other along plane 6. Any suitable mechanism, for example hydraulic rams, or even simple pushing depending upon the size of the tube, may be used to effect the displacement. This sliding displacement will cause the cross sectional area of the inner mould to reduce, and so allow separation of the inner mould from the tube.

In the preferred embodiment depicted in FIG. 2 the inner mould is substantially square in cross section. The plane 6 splits the mould into two parts 4a and 4b. The plane preferably extends longitudinally the length of the inner core and preferably intersects either end of the mould core.

Alternatively a three part construction of the inner mould core could be used with a wedge shaped plug separating first and second inner mould parts. Removal of the wedge will operate to reduce the cross sectional area of the inner mould core.

Other techniques include an expandable inner mould. Such a mould may be inflatable or it may expand under the operation of heat or other forms of pressure such as hydraulic pressure. Alternatively a mechanical arrangement may be used to alter the diameter of the inner mould.

To reduce the surface tension effects occurring between the outer mould and the outer liner, a split outer mould 5, as shown in FIG. 2 is used in the preferred embodiment. The skilled addressee will appreciate that an expandable outer mould or other type of outer mould which is changeable in cross sectional area or that allows the introduction of air between tube and the mould could also be used.

The technique employed to manufacture the tube allows the inner and outer liners to be of various shapes. The two liners may each be of differing shapes. For example, the inner liner may be substantially square and the outer liner circular. Alternatively a substantially square outer liner may be employed around a circular inner liner. A variety of other shapes for both liners may also be employed as required. To form elaborate outer shapes, the use of the outer mould as described above is preferred.

A suitable expanding material will bind the liners, form a self supporting structure for the tube and be readily inserted into the mould under pressure. The foam material of the preferred embodiment is preferably a hard setting expandable foam such as polyurethane. Any other filler material providing similar properties may alternatively be used.

Once inserted into the mould the filler material will preferably fill the tube cavity defined by the mould. When the outer liner is not a self supporting structure the outer shape of the tube will be defined by the outer mould shape. Similarly the tube will preferably form around the inner mould core adopting its shape.

For efficient manufacturing it is preferable that the filler material set within a reasonable period of time depending upon the size of the tube and the manufacturing systems In use, for example, 10 to 30 minutes of being inserted into the mould.

Where woven liners are used the filler material may seep between the weaving before setting. To prevent this it is possible to locate an impervious layer such as a polyethylene between the liner and the filler material. In such a construction it is preferable to glue the impervious layer to the liner material.

The outer liner will, for application to concrete casting, preferably be able to withstand the hoop stress exerted by a four metre column of cement 600 mm in diameter.

In applications encountering greater hoop stress a number of outer liners may be concentrically located at differing radius' throughout the filler material. This is preferably achieved by locating at least two woven liners of different diameters concentric with the mould and then inserting the filler material. The filler material passes through the woven liners without the polyethylene barrier. The location of the liner within the filler structure is determined by the diameter of the filler bag used.

Suitable materials for the outer and inner liners have been found to be woven plastic or textile materials, such as polypropylene, preferably as a continuous sleeve; plastic sheet materials, for example PVC, nylon or polypropylene; cardboard; or metal foils, such as aluminium. Any suitable material may be employed, singly or in combination.

Preferably the inner liner will be a polyvinylchloride (PVC) tube or sheet. Where the PVC sheet is used it is preferably formed around the inner mould and then secured in place by the operation of glue or tape. It will be understood that the set foam material will provide a good bond—the taping is only required to hold the material in place during moulding. The PVC liner provides a high grade finish for concrete casting operations.

It is envisaged that the above tubing product will have a range of applications. These applications include use as form work for concrete casting. As a protective impact resistant layer for buried pipe work. The tubing may also be used a air conditioning duct. Alternatively the tubing may be used as buoyant pipe work for particular dredging operations.

The skilled addressee will appreciate that the range of applications within the spirit and scope of the present invention extend beyond the particular applications disclosed herein.

What is claimed is:

1. A method of manufacturing a composite tube comprising the steps of:
   a) supporting and locating a flexible inner liner on an inner mold core;
   b) locating and supporting a flexible outer liner in axial alignment with the inner liner, so as to create an annular space between the inner and outer liners;
   c) introducing a foaming material between the liners so as to fill the annular space;
   d) allowing the foaming material to cure sufficiently to form together with the liners a self-supporting composite tube; and
   e) reducing the cross-sectional area of said inner mold core after forming said composite tube to facilitate removal of said composite tube from said inner mold core.

2. A method according to claim 1, wherein said inner mold core is formed of at least two parts which are relatively displaceable so that the cross-sectional area of the inner mold core can be reduced after forming said composite tube.

3. A method according to claim 2, wherein the at least two inner mold parts are relatively displaceable along a plane at an angle to a longitudinal axis of the inner mold core.

4. A method according to claim 1, further comprising the step of supporting the outer liner during step (c) on an outer mold disposed to at least partly surround said inner mold core.

5. A method according to claim 4, wherein said outer mold core is formed of at least two parts that are displaceable to facilitate extraction of said composite tube.

6. A method according to claim 1, wherein step (b) includes locating spacing elements between said inner mold core and the outer liner.

7. A method according to claim 1, wherein the outer liner is formed from a continuous sleeve material.

8. A composite tube comprising a sleeve-like outer liner, a flexible inner liner, and a rigid, plastics-material foam core formed in situ between the inner and outer liners, said composite tube being prepared according to the method of claim 1.

9. A composite tube according to claim 8, wherein the inner liner has a different cross-sectional shape relative to the outer liner.

10. A composite tube according to claim 8 or 9, wherein the inner and outer liners are made of a material selected from the group consisting of woven plastics, woven textiles and sheet material, wherein the foam material comprises a hard-setting polyurethane.

11. A composite tube according to claim 10, wherein the inner and outer liners are made of a material selected from the group consisting of PVC, nylon, polypropylene, cardboard and metal foil.

12. A composite tube according to claim 11, wherein the metal foil comprises aluminum foil.

13. A method according to claim 1, wherein the inner liner has a different cross-sectional shape to relative to the outer liner.

14. A method according to claim 1, further comprising locating and supporting at least one woven liner co-axial with and between the inner and outer liner prior to step (c), wherein the woven liner is adapted to allow passage of foaming material therethrough.

15. A method according to claim 1 or 14, wherein the outer liner comprises a woven material.

16. The method according to claim 15, further comprising locating an impervious layer on the outer liner surface facing the foam material prior to step (c).

* * * * *